Nov. 27, 1962  J. T. PARRETT  3,065,811
DRIVE TRANSMISSION SUSPENSION FOR MOTOR VEHICLES
Filed April 13, 1959  3 Sheets-Sheet 3
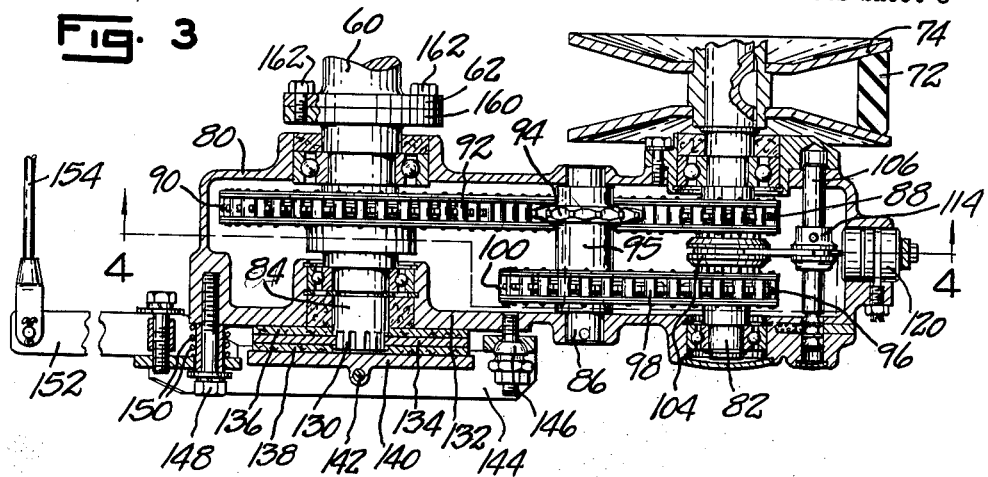
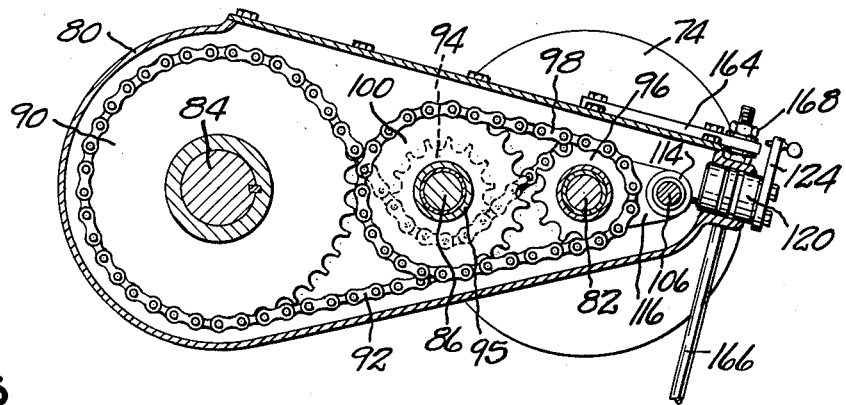
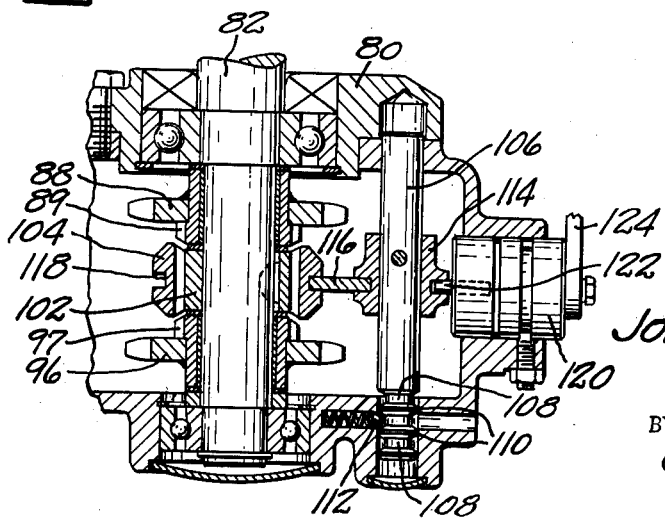
JOHN T. PARRETT.
INVENTOR.
BY Eugene C. Knoblock
ATTORNEY United States Patent Office 3,065,811
Patented Nov. 27, 1962

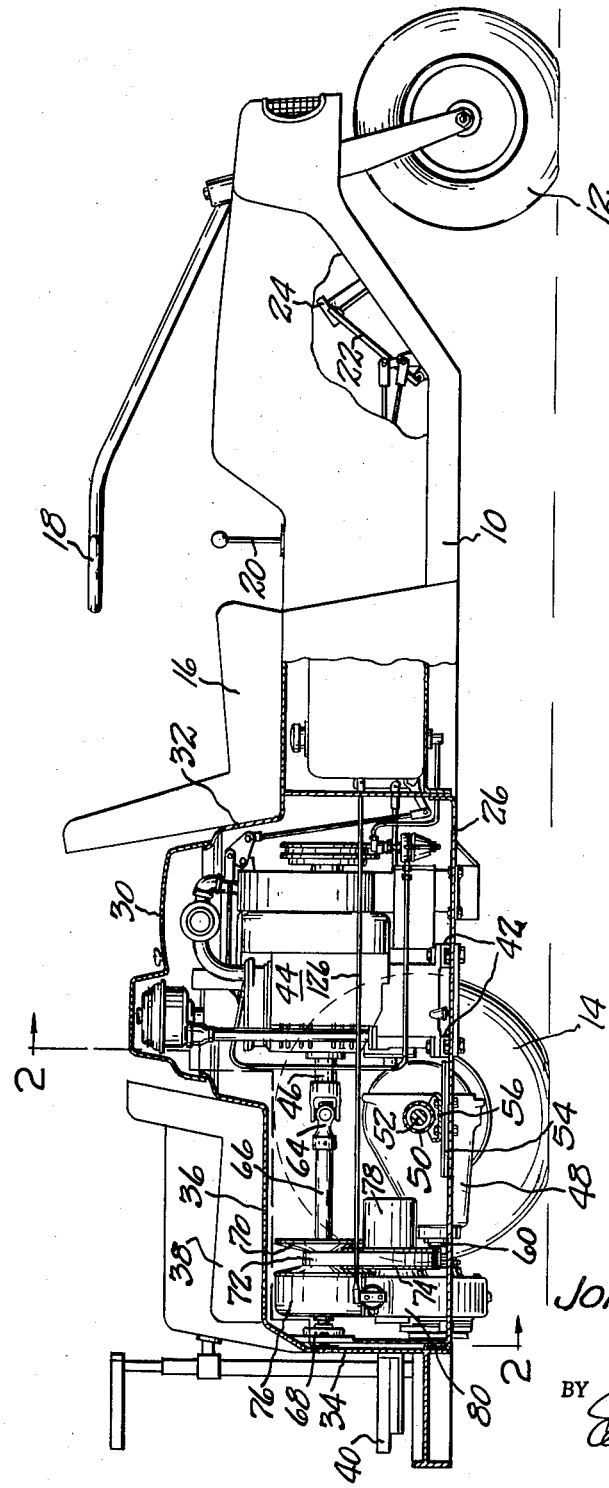

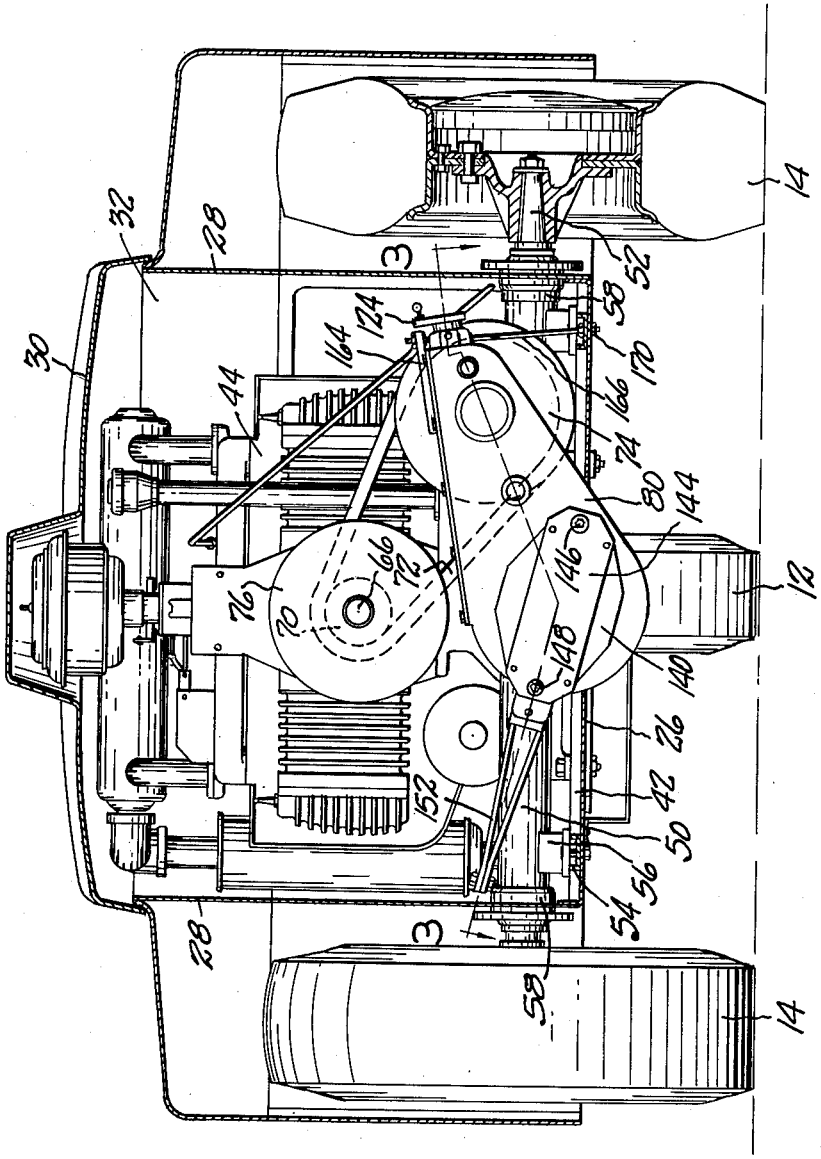

3,065,811
DRIVE TRANSMISSION SUSPENSION FOR MOTOR VEHICLES
John T. Parrett, 372 Bradford Drive, Benton Harbor, Mich.
Filed Apr. 13, 1959, Ser. No. 806,056
3 Claims. (Cl. 180—70)

This invention relates to improvements in drive transmission suspension for motor vehicles and more particularly to a drive transmission suspension for small vehicles having an engine positioned adjacent to the driving wheels.

The primary object of this invention is to provide a simple construction for mounting a drive transmission unit in a vehicle quickly and with a minimum number of securing members, with the transmission being supported principally upon or through its output shaft and the connection thereof to the input shaft of a driving axle unit having differential gearing.

A further object is to provide a device of this character which eliminates the need for special transmission mountings of accurate shape and accurate location and which enables a standard transmission housing to be fully integrated with the differential of a driving axle unit.

A further object is to provide a device of this character in which a transmission unit is positioned operatively in relation to the prime mover and the driving axle by the securing means which anchor it to the axle in driving relation thereto and by a simple torque reaction bolt so as to eliminate the need for accurately spaced mounting holes in the vehicle frame and to eliminate the need for use of flexible couplings.

A further object is to provide a device of this character wherein a drive transmission is easily removable and replaceable as a unit for servicing.

A further object is to provide a device of this character wherein a transmission unit driven by a belt drive input unit is positioned in part by a torque bolt adjustable to vary the tension of the driving belt and operative in all positions of adjustment to operatively relate and orient the transmission to remaining parts of the vehicle.

Other objects will be apparent from the following specification.

In the drawings:

FIG. 1 is a side view of a vehicle with parts broken away to illustrate the relation of the drive transmission to the prime mover and the driving axle assembly unit;

FIG. 2 is a vertical transverse sectional view taken on line 2—2 of FIG. 1;

FIG. 3 is an enlarged sectional view illustrating the construction of one type of drive transmission mechanism and taken on line 3—3 of FIG. 2;

FIG. 4 is a transverse sectional view of the drive transmission unit taken on line 4—4 of FIG. 3; and FIG. 5 is an enlarged fragmentary sectional view taken on line 3—3 of FIG. 2.

Referring to the drawings which illustrate the preferred embodiment of the invention as incorporated in a small vehicle adapted for use as a golf car or a utility vehicle, the numeral 10 designates a chassis supported upon steering wheel or wheels 12 and driving wheels 14. The vehicle will include one or more passenger seats 16 and suitable controls for the vehicle readily accessible from said seat and including a steering tongue or tiller 18 in the form shown, a gear shift lever 20, accelerator pedal 22 and brake pedal 24.

The chassis preferably includes a rear enclosure which may be provided with bottom wall 26, side walls 28, top wall 30, front wall 32 and rear wall 34. The enclosure may be of any desired configuration, and as here shown the top is preferably stepped to provide a rear lower portion 36 thereof mounting a rear seat 38. A rear foot rest 40 projects rearwardly from the enclosure. The enclosure bottom may mount reinforcing members 42 for supporting an internal combustion engine 44 rearwardly of the seat 16 and preferably forwardly of the axle of the rear wheels 14. Engine 44 will have an output or drive shaft 46.

The bottom 26 of the engine compartment will preferably have an opening therein to receive the projecting portion of the differential housing 48 associated with the axle housing 50 for the drive axle 52. Plates or reinforcing members 54 will preferably be carried by the bottom 26 adjacent to the differential to support brackets 56 carrying the axle housing 50. Suitable mounting members 58 may be carried by the side walls 28 to support the axle housing at its ends. The ends of the axle 52 project outwardly of the mountings 58 to mount the driving wheels 14. An input shaft 60 associated with the differential mechanism, which may be of any standard construction, is journaled in and projects from the differential housing 48 and preferably terminates in a transverse flange 62, as best seen in FIG. 3.

The output shaft 46 of the engine is preferably connected by a universal joint 64 to the shaft 66 whose rear end is preferably journaled in suitable bearing 68 carried by the rear vehicle wall 34. The engine driven shaft 66 drives the input element of an automatic mechanical torque converter or laterally extending drive unit. As here illustrated, a torque converter is used and constitutes a pair of split adjustable or variable pitch sheaves of the well known "Reeves" pulley type, one of which sheaves 70 is mounted upon the shaft 66 and has a belt 72 trained thereon and said belt is also trained around a sheave 74. Split sheave 70 is associated with a suitable torque responsive or spring urged adjusting unit 76 tending to urge the split sheave parts to predetermined relation, and split sheave 74 is associated with a torque responsive or spring urged adjusting unit 78 tending to urge the split sleeve parts to predetermined relation.

A drive transmission unit is driven by the output of the torque converter, as by the output sheaves 74, and may be of any suitable type. A chain driven type of transmission unit has been illustrated in FIGS. 3, 4 and 5. It will be understood, however, that a gear type transmission unit may be employed if desired. In the construction shown in FIGS. 3, 4 and 5, the transmission has a housing 80 preferably in elongated form, within which are journaled by suitable bearings an input shaft 82 mounting sheave 74, an output shaft 84, and an intermediate shaft 86, which extend parallel to each other. A sprocket 88 is journaled on shaft 82, and a sprocket 90 is keyed to output shaft 84. A chain, such as a roller chain 92, is trained around the sprockets 88 and 90, and one run of said chain meshes with the sprocket 94 fixed on a sleeve 95 journaled on the intermediate shaft 86. A second sprocket 96 is journaled on input shaft 82 spaced from sprocket 88 and has trained therearound a chain 98, such as a roller chain, which also is trained around a sprocket 100 fixed to the sleeve 95 journaled on the intermediate shaft 86.

A gear 102 is splined on the shaft 82 between the sprockets 88 and 96, and the hub portions of the sprockets 88 and 96 include gears 89 and 97, respectively, complementary to the gear 102. An internally toothed ring gear or collar 104 is slidable on the gear 102 between a centered position engaging only the gear 102, as illustrated in FIG. 5, and positions axially displaced from such center position and engaging both the splined gear 102 and a selected one of the two sprocket hub gears 89 and 97. It will be apparent that in the center position of the collar 104 illustrated in FIG. 5, the transmission is in neutral position inasmuch as both of the sprockets 88 and 96 are journaled upon the shaft 82. In one adjusted position in which the collar 104 meshes with the geared hub portion 89 of the sprocket 88, the rotation of the shaft 82 rotates the collar 104 through its meshing engagement with the splined gear 102, and this collar in turn meshing with the gear hub 89 of the sprocket 88 serves to drive the chain 92 and thus produce rotation of the output shaft 84 in one direction. When the collar 104 is in its opposite extreme operating position, rotation of the shaft 82 is transmitted through gear 102, collar 104, the geared hub 97 of the sprocket 96, and the chain 98 to the sprocket 100 which drives its mounting sleeve 95 and sprocket 94 in a direction opposite the direction in which the sprocket 94 is driven in the setting of the device previously mentioned in which the collar 104 meshes with the geared hub 89 of the sprocket 88. This reversal of direction of rotation of the sprocket 94 serves to drive the chain 92 and the output shaft 84 in a direction reverse of the direction first edscribed.

The position of the collar 104 is controlled by a shifting mechanism, and the mechanism here shown consists of a rail shifter or bar 106 adjacent and parallel to the shaft 82 and slidable endwise in suitable bearings. The rail shifter or bar 106 has a plurality of adjacent reduced diameter or neck portions 108 separated by circumferential ribs or shoulders 110. A spring-pressed ball 112, shiftable in a socket in the casing 80, seats in a selected groove 108 to hold the rail shifter or bar 106 in any longitudinal adjustment in which it may be set. The rail shifter 106 mounts a carrier 114 for a finger 116 which projects into a circumferential groove 118 in the collar 104.

A hub 120 is journaled in the casing 80 on the axis perpendicular to the axis of the rail shifter 106 and adjacent thereto. Hub 120 mounts an eccentric pin 122 which projects into a groove in the carrier 114. A lever 124 is secured to the outer end of the hub and is connected, through suitable linkage including the link 126, with the gear shift lever 20. It will be apparent that rotation of the hub 120 swings the pin 122 in selected direction to move the carrier 114 and the part 116 for the purpose of shifting axially the collar 104 to selected position.

The transmission unit illustrated also includes a brake controlling the output shaft 84. As here illustrated, a splined portion 130 of the output shaft 84 projects from a flat wall 132 of the housing 80 of the transmission. A metal disk brake or plate 134 is splined on shaft portion 130. A disk 136 of anti-friction material is interposed between the brake disk 134 and the housing wall 132. A second disk 138 of anti-friction material bears against the opposite or outer surface of the brake disk 134 and may be mounted upon the inner surface of a pressure plate 140 pivoted at 142 to the intermediate portion of an elongated brake lever 144 which in turn is pivotally connected at 146 to the housing 80. A pilot 148 supports the lever and a coil spring 150 preferably encircles the pilot and urges the lever spaced from the housing to brake-releasing position. The lever preferably includes a projecting end portion 152 with which is connected suitable linkage including the link member 154 which is connected to the brake pedal 24.

The drive transmission unit consisting of the parts housed in and supported by the casing 80, together with the split sheave or other part 74 of the automatic mechanical torque converter which is mounted upon the shaft 82, and together with the brake mechanism actuated by the lever 144, 152 is preassembled and is mounted as a unit in the vehicle. For this purpose the output or driving shaft 84 of the transmission which is aligned with differential shaft 60 is provided with an enlarged transverse flange 160 at its free or outer end positioned outwardly of the casing 80 and adapted to engage the flange 62 on the end of the input shaft 60 of the differential. A plurality of cap screws 162, or other securing means, fixedly interconnect the disks 62 and 160, there preferably being three or four of such bolts or securing members. The anchorage effected through such securing members 162 is such as to support the weight of the transmission unit from the shaft 60. The housing 80 of the transmission includes a projecting plate portion 164 carried thereby as the end thereof remote from the drive shaft 84. A torque reaction bolt 166 is anchored at one end thereof adjustably to the transmission housing plate 164 by means of nuts 168, and the opposite end of said torque reaction bolt 166 is adjustably anchored to the frame or chassis of the vehicle by nuts 170.

This combination and arrangement of parts permits close coupling of the engine 44 and the driving axle 52. The fixed mounting of the output shaft of the transmission unit upon the shaft 60 which is fixedly oriented relative to the chassis by the differential housing part 48, together with the mounting of the respective parts of the automatic mechanical torque converter unit upon the shafts 66 and 82, provides a compact simple drive train between the engine and the axle. It is interesting to observe that the principal weight of the transmission unit is supported by the shaft 60 which it drives through the bolts or other securing members 162 which connect the flanges 62 and 160. All that is necessary in addition to the effecting of the connection of the securing members 162 is to effect a connection of the torque reaction bolt 166 with the free end of the transmission housing and with the vehicle chassis in order to assemble the transmission in operative relation. Once this transmission unit has been so assembled the control links 126 for actuating the transmission and the control link 154 for actuating the brakes complete all connections to be made to the transmission.

This simple mounting of the transmission makes it possible to remove the transmission quickly and easily, thereby rendering it possible to secure convenient access to the operating parts of the drive transmission system and to the engine as needed. It will be apparent that the torque reaction bolt can be adjusted to vary the angular disposition of the transmission unit housing 80 and thereby control the tension upon the belt 72 or other drive transmission means of the torque converter. It will also be apparent that by reason of the direct support of the transmission unit upon the shaft which it drives only one connection of that transmission unit with the chassis, namely through the torque reaction bolt 166, is necessary. This eliminates the need for accurately spaced mounting holes in the vehicle frame, eliminates the need for special brackets, and also eliminates the need for flexible couplings in the drive transmission train.

While the preferred embodiment of the invention has been illustrated and described, it will be understood that changes in the construction may be made within the scope of the appended claims without departing from the spirit of the invention.

I claim:

1. A drive transmission suspension for motor vehicles, comprising an engine having a drive shaft, a driving axle unit including a differential housing journaling gearing and an input shaft, said differential housing being fixedly mounted on said vehicle, a transmission unit having a housing and input and output shafts journaled in said housing, means detachably connecting said transmission output shaft to the input shaft of said driving axle unit in fixed relation, means drivingly connecting said transmission input shaft and said engine drive shaft, and a torque reaction rod connected at opposite ends thereof to said vehicle and detachably to said transmission housing, said engine shaft and transmission shaft connecting means including a pair of adjustable spring-urged split sheaves and a belt trained over said sheaves, said torque reaction rod being adjustable to vary the position of said transmission housing and the tension of said belt.

2. A drive transmission suspension for motor vehicles, comprising an engine having a drive shaft, a driving axle unit including a differential housing journaling gearing and an input shaft, said differential housing being fixedly mounted on said vehicle, a transmission unit having a housing and input and output shafts journaled in said housing, both said differential input shaft and said transmission output shaft terminating in transverse end flanges and means detachably connecting said flanges, means drivingly connecting said transmission input shaft and said engine drive shaft, and a torque reaction rod connected at opposite ends thereof to said vehicle and detachably to said transmission housing to position the latter, said flanges and torque rod defining the sole support of said transmission unit.

3. In a vehicle, a chassis, an engine carried by said chassis, and having a drive shaft, a drive axle unit including a differential housing secured to said chassis and journaling differential gearing and an input shaft, drive transmission means interconnecting said engine shaft and differential input shaft and including a housing and an output shaft spaced laterally from said engine shaft and aligned with and detachably and rigidly secured to said differential input shaft, and adjustable means connecting said transmission housing to said chassis at a point spaced from said transmission output shaft, said last named means and the connections between said drive transmission means and said engine and differential input shafts constituting the sole means supporting and positioning said drive transmission means.

References Cited in the file of this patent
UNITED STATES PATENTS

| | | |
|---|---|---|
| 2,228,581 | Olen | Jan. 14, 1941 |
| 2,474,085 | Albright | June 21, 1949 |
| 2,489,274 | Donald | Nov. 29, 1949 |
| 2,510,325 | Anderson | June 6, 1950 |
| 2,626,672 | Leighton | Jan. 27, 1953 |
| 2,687,332 | Tilley | Aug. 24, 1954 |
| 2,691,928 | Kelsey et al. | Oct. 19, 1954 |
| 2,718,154 | Mathson | Sept. 20, 1955 |